March 8, 1938.  R. H. HILLMAN  2,110,151
CHAIR, SEAT, AND THE LIKE
Filed Jan. 26, 1932  2 Sheets-Sheet 1
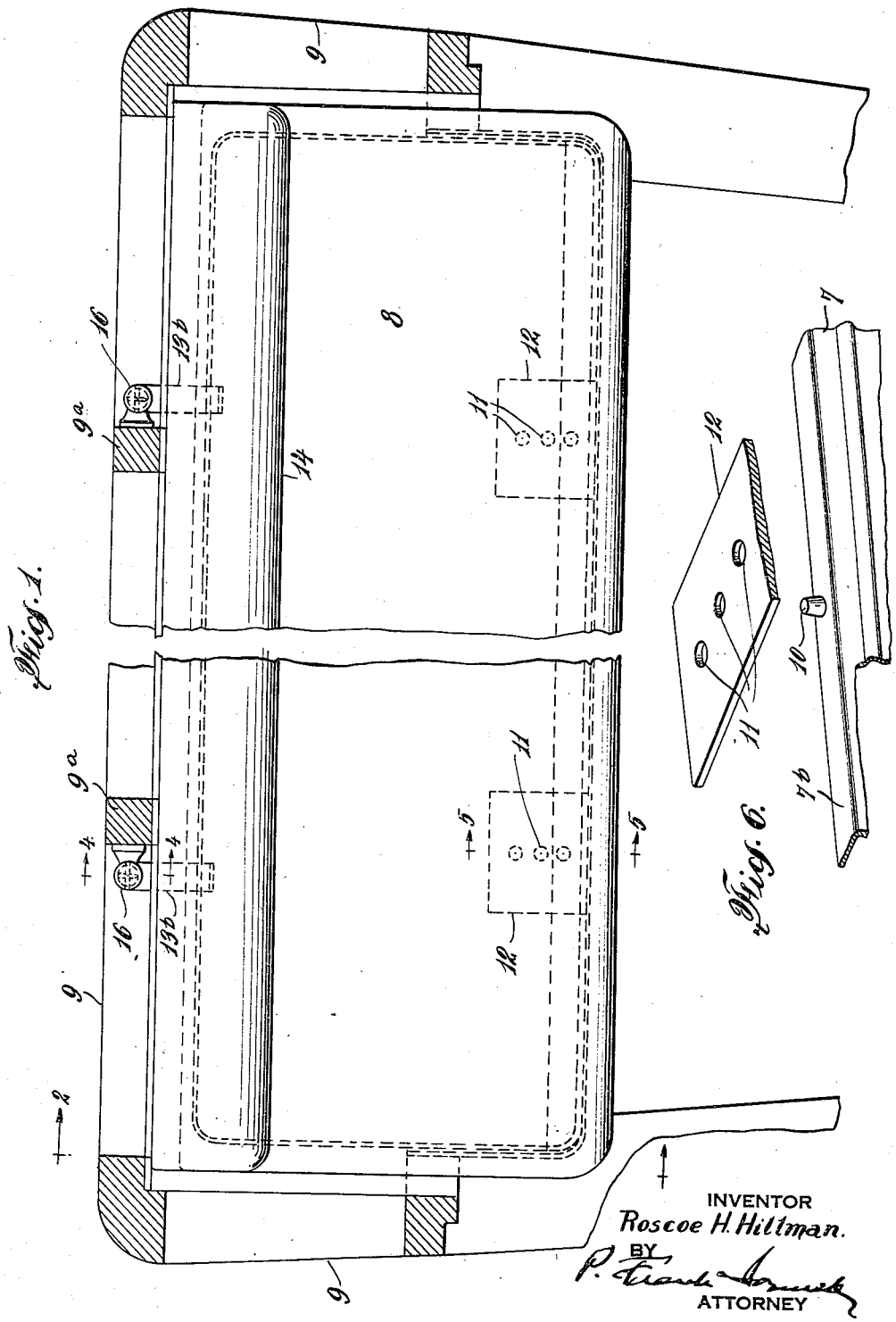
INVENTOR
Roscoe H. Hillman.
BY
ATTORNEY

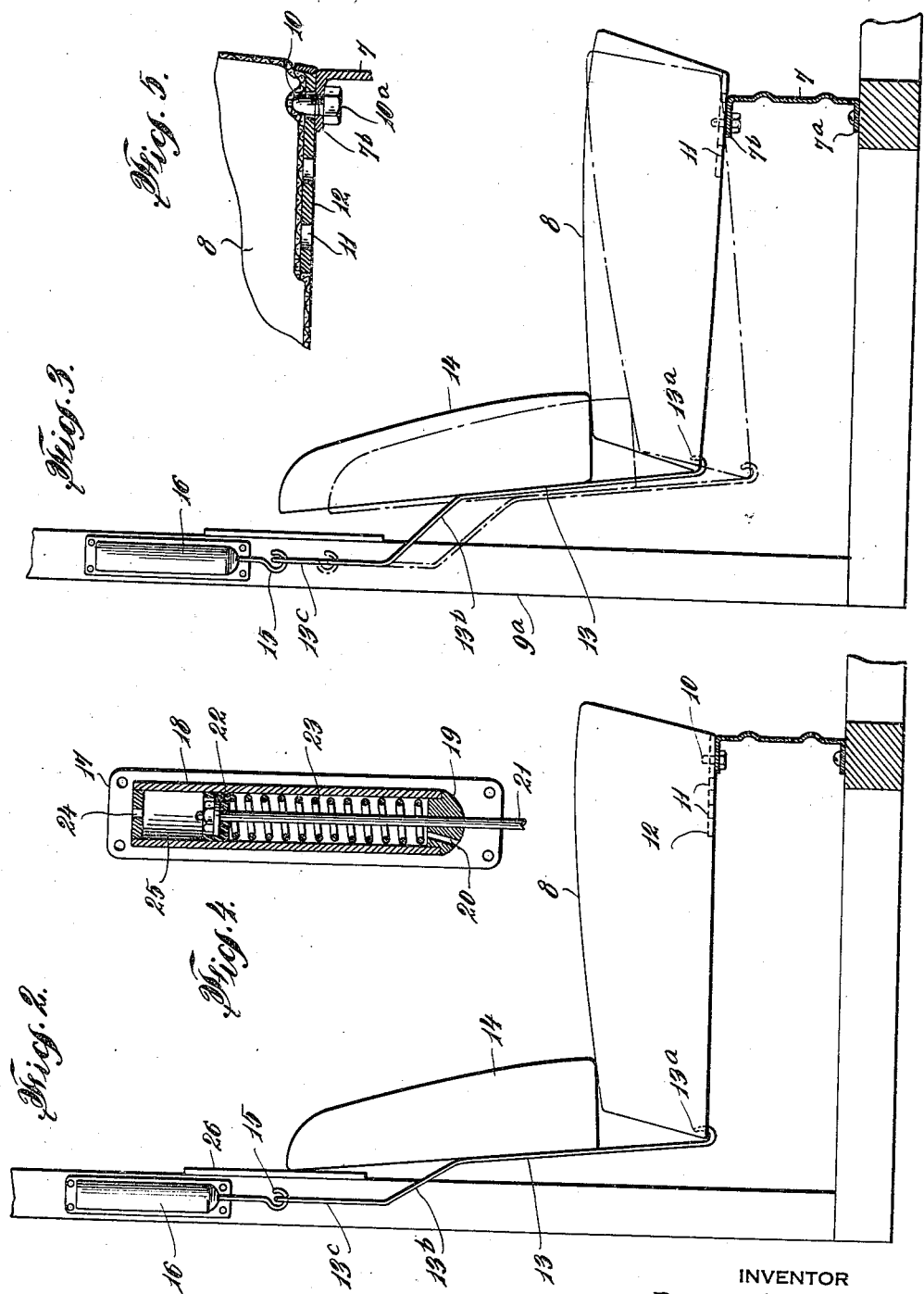

Patented Mar. 8, 1938

2,110,151

UNITED STATES PATENT OFFICE 2,110,151

CHAIR, SEAT, AND THE LIKE

Roscoe H. Hillman, Philadelphia, Pa., assignor to The Autocar Company, Ardmore, Pa., a corporation of Pennsylvania Application January 26, 1932, Serial No. 588,848

2 Claims. (Cl. 155—53)

This invention relates to seats, chairs, and other devices which are designed or adapted to support the human body in a sitting attitude or posture.

While my invention, as hereinafter will become evident, possesses a wide range of utility in the production of seats or chairs for household and various other purposes, I have elected to direct the present disclosure, more or less, to the practicing of my invention in the construction of vehicle seats, to which it is especially applicable. I would have it understood, however, that this is not to be construed, in any sense, as a limitation of the scope of my invention or of its application to this specific use.

In motor vehicles, which are designed to be operated along the public roads or highways, as an example of a type of vehicle to which my invention may be advantageously applied, it is essential that a seat, in order to promote the physical comfort and well-being of an occupant, should be capable of a cushioning action to offset or counteract the effects of the shocks and jars which may be communicated or transmitted thereto, in varying degrees, in the operation of the vehicle. The seats are generally of an upholstered construction, embodying the usual helical springs as supporting elements, which, under present practice, are relied upon to cushion the movements of the seat under load. In some instances, provision has been made to adjust the seats forwardly or rearwardly, as may be required, so that persons of different stature may be more comfortably accommodated. This latter adjustment of the seat is particularly desirable in the driving compartment of a vehicle, in order that the operator may assume a position relative to the controls, especially the steering wheel, which will facilitate their operation and afford him a maximum road vision from the position which he occupies. While the forward and rearward adjustment of the seat, as now practiced, promotes the comfort and efficiency of the occupant to a certain degree, with the prevailing tendency to low seat construction, and an increase in the angle of rearward inclination, the occupant is subjected to considerable discomfort because of the fact that the back rest, which is usually fixed, provides an immovable surface which, in the contact of the back of the occupant with the seat, is creative of a frictional resistance that, in a large measure, counteracts the resilient or cushioning action of the seat. In other words, the vertical movement of the seat under load is appreciably retarded by the friction set up between the back of the occupant and the back rest of the seat, with the result that the advantages which should be derived from the dissipation of impact forces within the seat, are obtained only in part. It has been proposed to obviate the shortcomings of standard seat design, by providing for vertical movement of the back rest in synchronization with the up and down movements of the body of the seat occupant, but this attempt to solve the problem in company with other expedients which provide for relative movement of the seat and back rest, have failed to present a solution, for various reasons, largely due to their complicated design and obviously commercial impracticability, as well as their questionable efficiency in promoting the comfort of the occupant in the manner sought.

Therefore, it is the primary object of this invention to provide a seat, chair or other device for supporting the human body in a sitting posture of a simple, durable and practical construction that will automatically accommodate itself to the movements of the occupant so as to afford him a maximum of comfort, not only when the seat components and the occupant are respectively at rest, but during any movement of the seat elements that may be initiated in the seat or follow from the shifting of the position of the occupant thereon.

It is a further object of this invention to provide a method and means whereby a seat, chair or similar body-supporting device may be constructed to obtain the advantages which flow from the practicing of my invention by the use of standardized material, thereby eliminating the high costs of specially designed parts and imparting to my invention an extremely broad scope or utility.

More specifically, it is the object of this invention to provide a method and means of constructing a vehicle seat which will not possess certain disadvantages that are inherent to seats of present types, whereby the occupant of a seat produced in accordance with my invention will not be subjected to the discomforts that are a concomitant to existing seat design.

It is another object of my invention to provide a simple and efficient method and means of yieldably suspending a seat and its cooperating back rest from a relatively non-movable support, as a part of the structure defining the driver's compartment of a vehicle body, for conjoint movement in dissipating the forces of vibration and road shocks or impacts that are transmitted to the seat in the operation of the vehicle.

My invention also contemplates the provision of a simple and efficient means of connecting a yieldably suspended vehicle seat to a suitable support which will admit of the adjustment of the seat longitudinally of the vehicle to any of various pre-selected positions and, at the same time, facilitate the relative bodily movement of the seat in response to the functioning of the suspension devices; this connecting means being so constituted that it is susceptible of use in conjunction with seat constructions of other types.

Other objects and advantages flowing from the practicing of my invention will doubtless present themselves as the description proceeds, and I would have it clearly understood that I reserve unto myself all rights to the full range of equivalents, both in structure and in use, to which I may be entitled under my invention in its broadest aspect.

In the accompanying drawings I have illustrated a preferred embodiment of my invention, as it may be applied to a vehicle seat, as that in the cab of a motor truck, or similar vehicle.

In the drawings:

Figure 1 is a top plan view of a vehicle seat constructed in accordance with my invention.

Figure 2 is an end elevation taken on the line 2—2 of Figure 1.

Figure 3 is a view similar to Figure 2, showing the relative positions that may be assumed by the suspended parts of my improved seat when functioning.

Figure 4 is a sectional elevation, on the line 4—4 of Figure 1, of a form of mechanism that may be utilized in yieldably supporting the seat units.

Figure 5 is an enlarged sectional detail on the line 5—5 of Figure 1, and

Figure 6 is a view in perspective of the connecting means illustrated in Figure 5.

Referring now to the drawings in detail, in which like characters of reference are employed to designate similar parts in the several views, 7 indicates a fixed supporting member for the front edge of the seat unit 8 of my improved construction, this support, in the present showing, being a metal beam or girder flanged at 7ª and 7ᵇ and disposed transversely of the driver's compartment of the vehicle, the defining walls of which are generally indicated by the reference numeral 9.

The flange 7ᵇ of said support 7 is provided with a protuberance on its top surface, which, as herein shown, is formed by the shank of a pin 10 that is threaded into an aperture in said flange 7ᵇ and locked in position by means of a securing nut 10ª. Obviously, this pin may be welded to the flange or may take any other form that construction requirements may make desirable. Preferably the flange 7 is provided with two of these protuberances, such as just described, spaced longitudinally thereof to enter the orifices 11 in the plates 12 fixed to the base of the aforesaid seat unit 8, which may be of the standard resilient construction or any other suitable design.

As will be observed, in the present showing, three openings or holes 11 are shown in each plate 12 in which the pin 10 is adapted to enter. Thus, the seat unit 8 may be adjusted transversely of its support 7 to occupy any of the three possible positions which it may assume relative to said support by aligning the intermediate orifices 11 in the two plates, or those on either side thereof, with the cooperating pins 10, the latter, as will be evident, entering the openings with which they are in registration when the seat is abutting upon the flange 7ᵇ.

From the foregoing, it will be apparent that, while the seat unit 8, when connected to the supporting beam 7 by interengagement of the pins 10 with the holes 11 in the plates 12, is restrained from fore and aft movement, it is capable of a rocking movement or of being tilted relative to and upon the flange 7ᵇ, within certain limits, as fixed by the length of the pins 10 and the diameter of the orifices 11, for attaining the objectives of this invention in the manner hereinafter described, or for providing a simple hinged connection for the front edge of a seat unit in any construction where such is found to be desirable or expedient.

The rear edge of the seat unit 8 is supported at preferably two longitudinally spaced points by a hinged connection with a strap of metal of a suitable width, indicated at 13 to which the back rest 14 of the seat is fixed by bolting or in any other appropriate manner, the hinged connection between said strap and the seat unit 8, in the present instance, being provided by a hook 13ª formed at the lower end of said strap within which the rear frame member of the said seat unit is adapted to rest. Of course, in lieu of this arrangement, the seat unit 8 may be provided with a suitable fitting, with which the hook 13ª may engage, or the hook may be omitted and the strap connected to the seat unit in any other manner that may be feasible in obtaining the desired results.

The strap 13 above the zone in which it is connected to the back rest 14 is angularly offset as at 13ᵇ, this offset merging into a substantially vertical portion 13ᶜ which is provided with an eye to engage the hook 15, whereby the aforesaid strap and the two seat units are supported from a device 16 which is capable of functioning to control the vertical movements of the strap 13 and the inter-connected seat components, with a cushioning or dampening action, the said device 16 being fixed to a rigid part of the vehicle body structure, as to the uprights 9ª which support the rear wall of the driver's cab.

Any suitable means whereby the desired results may be obtained, may be employed for suspending the straps 13 and the strap-supported elements of the seat construction from the cab frame members 9ª. However, in Figure 4 I have illustrated a simple and practical form of shock-absorber or cushioning device that possesses the requisite range of action and may be advantageously employed in the practicing of my invention. This device includes a supporting base 17 for the cylindrical housing 18 provided with a head 19 having an air vent 20, which is bored to provide a bearing for the shaft 21 terminating in the previously described hook 15. This shaft 21, at its inner end, carries a piston 22, including the usual metal retainer and packing material, as a leather washer, with a spring 23 interposed between the head 19 and said piston, a suitable vent 24 being provided in the upper end of said housing. As will be obvious, in this form of device the desired dampening or cushioning characteristics flow from the action of the spring 23 and the compression of the air within the housing on either side of the piston, in response to the movement of the suspended load, as hereinafter described.

As hereinbefore explained, the seat unit 8 may be adjusted forwardly or rearwardly, or, in other words, transversely of the fixed support 7, so that the seat may accommodate occupants of different statures, or to make it more convenient to manipulate the vehicle operating controls, the load supporting unit 8, when the seat is occupied, being downwardly inclined from its front edge, the degree of inclination, of course, being dependent upon the weight of the seat occupant whose back rests or bears against the preferably conforming back rest 14. The spring 23 is thus placed in compression and the seat load is resiliently supported and adequately cushioned thereby against those normal vibratory movements of the vehicle which are transmitted thereto and which it has been found, under existing standards of seat construction, seriously impair the physical well-being of many motor vehicle operators and especially those engaged in commercial services. Now, as the forces resulting from the road impact or a major shock or jar to which the vehicle may be subjected, are transmitted to the seat load, the initial upward movement of the seat, as a unit, as it rocks upon its fulcrum provided by the flange 7$^b$, is retarded by the resistance offered to the upward movement of the piston by the air compressed within the chamber 25 of the device 16, as controlled by the size of the vent 24, the rebound of the resiliently suspended seat load being damped as the compression of the spring 23 increases, the detrimental forces being dissipated by the action of the device 16, similarly to that which obtains in analogous forms of so-called shock-absorbing appliances, as used in motor vehicle and other constructions.

As will be manifest, the back rest 14 in the vertical oscillations of which the seat is capable, moves with the load-supporting unit 8 of the seat construction and in synchronism with the body of the seat occupant. In other words, the seat occupant and the load-supporting unit 8, as well as the back rest 14 of the seat structure, move together as a unit under the retardative and cushioning influence of the suspension means or device 16, thereby entirely eliminating those discomforts to the seat occupant that must necessarily arise where, as in standard construction, the back rest is fixed, as hereinbefore pointed out.

Further, with the conjoint suspension of the back rest and load-carrying portion of the seat, as herein described, the occupant of the seat is enabled to assume a more comfortable posture, which is made possible by the automatic and body-conforming adjustment of the load-supporting unit 8 and the back rest 14 by the hinged connection of these units, as set forth, it being evident that as the front edge of the seat unit 8, rocks upon its supporting flange 7$^b$, in response to the functioning of the suspension devices, the plates 12 will cant upon their cooperating pins 10.

From the foregoing, it will be clearly apparent that my improved seat construction may be readily incorporated in passenger automobiles of the open and closed types and is also particularly applicable to the seating requirements of airplanes wherein landing shocks transmitted to the seats are often productive of great discomfort to their occupants.

In addition to the utilization of my invention in vehicles of various kinds, it may also be applied to chairs and hammocks of the so-called seat designs, to considerable advantage, as the method of yieldingly supporting the seat unit and back rest to move in unison with the body of the seat occupant affords the latter a greater degree of comfort in assuming different attitudes of postures, than in those structures in which the back rest is fixed.

Means, other than those illustrated and described, may be employed in carrying my invention into effect, within the spirit and scope of this disclosure. For example, in certain types of vehicles, or in chair or other constructions, it may be found desirable to locate the device 16, or its equivalent, adjacent the base of the seat, and to rearrange or otherwise dispose of the cooperating elements of the invention to attain the objectives to which it is directed, as hereinbefore set out, all of which come within the purview of the appended claims.

I claim:

1. The combination with a seat and a cooperating back rest and a rigid supporting surface, of means for suspending said seat and back rest from said surface for conjoint vertical movement and for relative adjustment, said means including a pair of members formed of strap metal, each terminating in a hook detachably engaged with the lower rear edge of said seat, a portion of each member above said hook being offset, said back rest being fixed to said members in a zone between the offset portions thereof and their seat engaging ends, yieldable devices mounted on said rigid supporting surface above the end of said offset portion, means for detachably connecting the ends of the offset portion of each of said members to a yieldable device and rigid means for supporting said seat adjacent its front edge for relatively arcuate movement, said seat being bodily shiftable longitudinally upon said latter means to change the fulcrum of the relative arcuate movement thereof.

2. The combination with a seat having a backrest and a body-supporting portion, of an element for cooperatively suspending said back-rest and the body-supporting portion from a suitable support for conjoint movement and relative adjustment, comprising a rigid metal strap fixed to the back-rest in a zone intermediate its ends and having a hook formed at its lower end in detachable engagement with the body-supporting portion, the portion of said strap above its zone of fixation to the back-rest being angularly offset rearwardly and terminating in a connection detachably engaging said support.

ROSCOE H. HILLMAN.